Feb. 7, 1961
W. G. TOLAND
2,970,657
DISK HARROW
Filed June 24, 1957
2 Sheets-Sheet 1
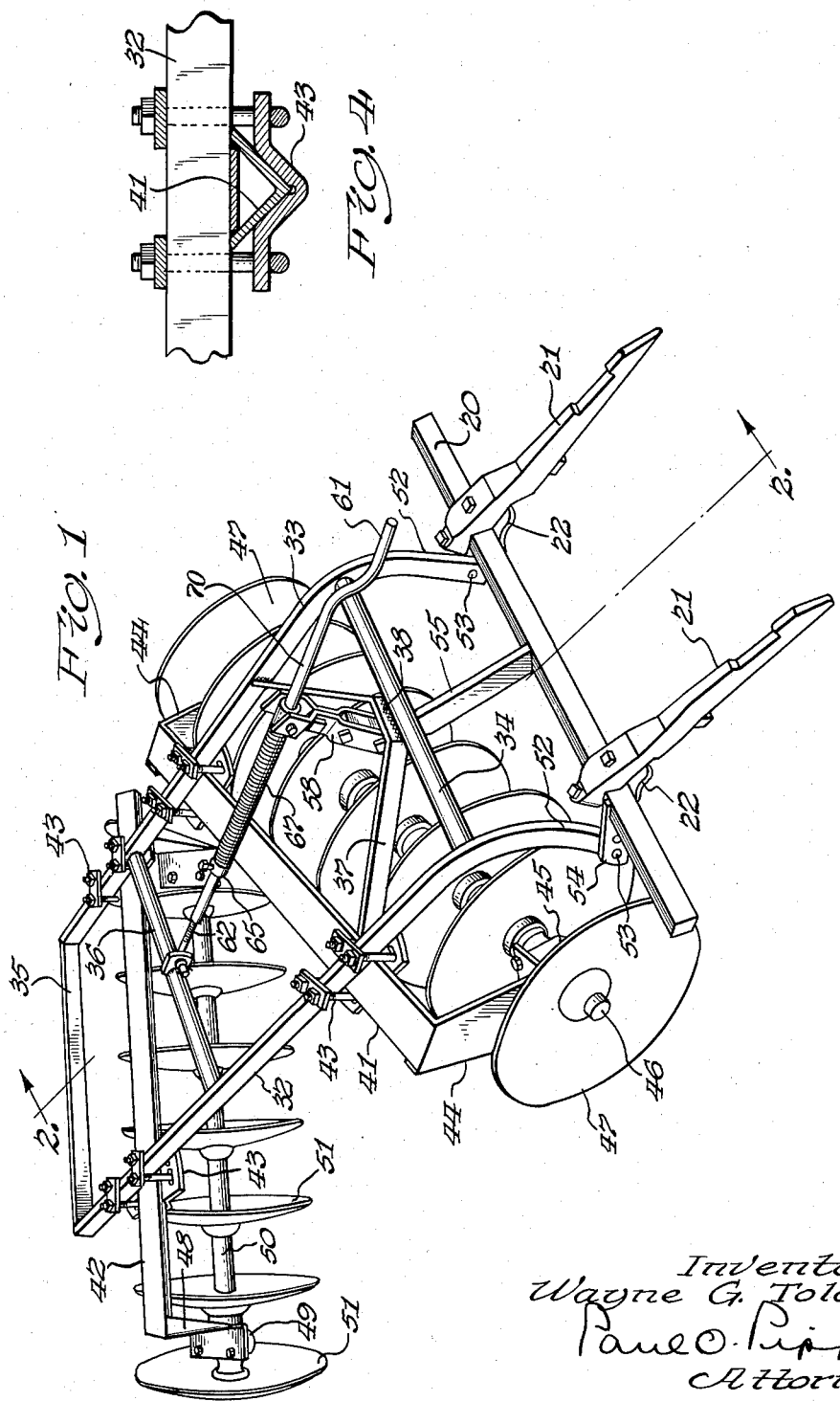
Inventor
Wayne G. Toland
Paul O. Pippel
Attorney Feb. 7, 1961 W. G. TOLAND 2,970,657
DISK HARROW
Filed June 24, 1957 2 Sheets-Sheet 2
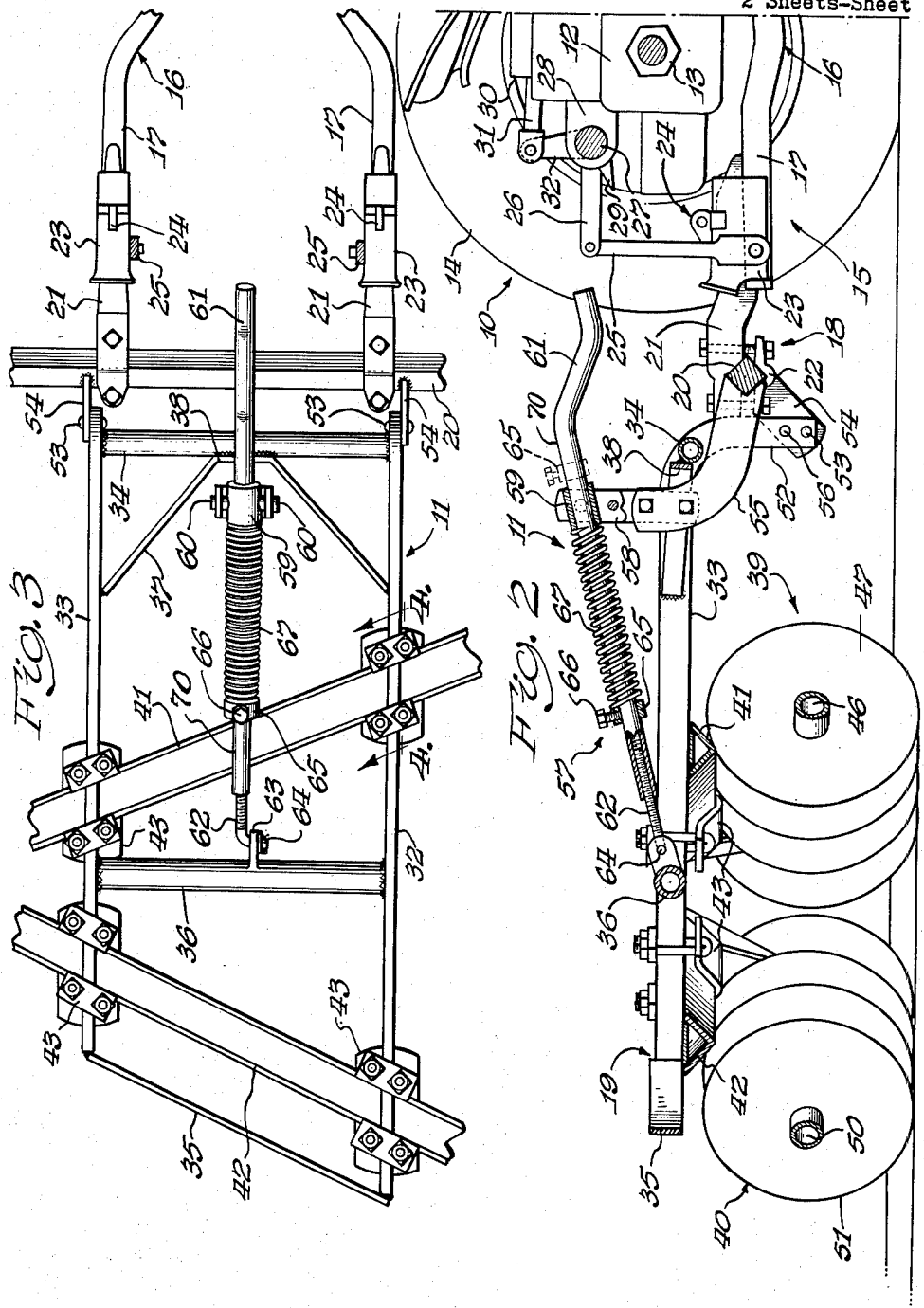
Inventor
Wayne G. Toland
Paul O. Pippel
Attorney United States Patent Office 2,970,657
Patented Feb. 7, 1961

2,970,657
DISK HARROW
Wayne G. Toland, Stockton, Calif., assignor to International Harvester Company, Chicago, Ill., a corporation of New Jersey
Filed June 24, 1957, Ser. No. 667,368
4 Claims. (Cl. 172—455)

This invention relates to agricultural implements and particularly to disk harrows. More specifically, the invention concerns a disk harrow of the offset type adapted to be mounted on a tractor to be carried thereby in transport.

The invention is described and shown herein as a righthand offset disk harrow of the fixed angle type; that is, a harrow in which the selected working angle of the disks is retained during transport, the implement being elevated above the ground by the propelling vehicle. One of the difficulties encountered with harrows of this type has been the balancing of the front and rear disk gangs. The front gang tends to dig in while the rear gang tends to ride out of the ground. Also, when the harrow is connected in the conventional way to a tractor drawbar the weight of the tractor is imposed upon the front gang when the tractor drive wheels encounter a depression in the ground. The present invention contemplates the avoidance of previous difficulties in the designing of disk harrows, and has for its object the provision of an improved tractor mounted harrow of novel construction wherein means are provided to assure uniform operation of the harrow gangs under all soil conditions.

Another object of the invention is the provision of an offset disk harrow of novel construction wherein the implement is free to float and follow the contour of the ground while it can be lifted on a tractor to form a unit therewith for transport.

Another object of the invention is to provide an offset disk harrow of unique construction adapted for integral association with a tractor, wherein the harrow consists of a main frame and an auxiliary tool-carrying frame, and wherein the tool-carrying frame is capable of floating relative to the main frame and the main frame is connected to the tractor for vertical floating relative thereto, while the entire assembly is liftable upon the tractor to be transported thereby.

A further object of the invention is to provide a novel tractor and disk harrow combination wherein the harrow can be lifted on the tractor for transport, but which in operation retains the advantages of a trail-behind implement.

Another object of the invention is to provide, in a disk harrow wherein a tool or subframe carrying longitudinally spaced disk gangs is pivotally connected to a main or hitch frame on a transverse axis for vertical floating, a rod slidably connecting said frames having a spring thereon adapted to yieldably oppose upward pivoting of the subframe, and optionally operable means for disabling said spring and holding the tool frame against upward movement relative to the hitch frame.

Other objects and advantages of the invention will become clear from the following detailed description when read in conjunction with the accompanying drawings wherein:

Figure 1 is a view in perspective of an offset disk harrow adapted to be directly connected to a tractor to be carried thereby in transport, and incorporating the features of this invention;

Figure 2 is a view in side elevation, in section, taken on the line 2—2 of Figure 1 and showing the rear end of a tractor, with one drive wheel removed, upon which the implement is mounted;

Figure 3 is a partial plan view of the implement shown in Figure 1; and

Figure 4 is a section taken on the line 4—4 of Figure 3.

In the drawings the numerals 10 and 11 designate, respectively, a tractor and releasable implement integrally associated therewith, the tractor having a longitudinally extending body 12, a transverse rear axle structure 13 and laterally spaced drive wheels 14, only one of which is shown.

Forming part of the tractor is a draft structure 15 in the form of a drawbar comprising a U-shaped portion 16 having laterally spaced arms 17 and pivotally connected to the tractor in a manner not shown, but well known in the art, accommodating vertical movement of the draft structure about said forward pivot.

The implement 11 described herein is a disk harrow of the offset type comprising a main or hitch frame 18 and a tool-carrying subframe 19. Hitch frame 18 includes a transversely extending tool bar 20, square in cross-section, having adjustably secured thereto at laterally spaced locations a pair of longitudinally elongated shaft members 21, secured to the tool bar by clamps 22. Shaft members 21 are slidably received in complementary socket members 23 mounted on the rear ends of arms 17. Shaft members 21 are locked in the sockets 23 by suitable latch means indicated at 24, the details of construction of which form no part of this invention, whereby the hitch structure 18 forms an integral association with the draft structure 15 of the tractor.

The hitch structure 15 is adapted to be raised and lowered with respect to the tractor by power lift apparatus including vertically extending links 25, the lower ends of which are pivotally connected to the socket members 23, and the upper ends of which are pivotally connected to the rear ends of lift arms 26 mounted on a transverse shaft 27 for swinging relative thereto. Shaft 27 is rotatably mounted in brackets 28 affixed to the tractor body and one or more stop members 29, affixed to shaft 27 are engageable with the undersides of lift arms 26 upon rocking of the shaft in a clockwise direction, as viewed in Figure 2. Rocking of the shaft 27 is accomplished by conventional power transmission means such as a hydraulic cylinder 30 anchored to the tractor and having a piston rod 31 slidable therein and pivotally connected to the upper end of a rock arm 32 affixed to the shaft 27. Thus, in an operating position of the implement such as shown in Figure 2, the draft structure 15 is capable of vertical floating, downward movement thereof being limited by the stop 29 on shaft 27.

A tool carrying frame 19 is generally rectangular and comprises a pair of laterally spaced frame bars 32 and 33 connected forwardly by a transverse tubular brace 34. The rear ends of frame bars 32 and 33 are connected by a bracing bar 35 and between brace bar 35 and member 34 another tubular brace 36 is provided. An additional arched brace member 37 is secured at its ends to the bars 32 and 33 and has a forwardly extending transverse portion 38 which is affixed to the tubular brace 34.

The harrow shown in the drawings is set for righthand operation and includes a pair of front and rear disk gangs 39 and 40 which comprise tubular members 41 and 42, triangular in section, which converge to the left, as shown in the drawings, and are secured to the frame bars 32 and 33 by clamping means indicated at 43. The structure of bars 41 and 42 and clamping means 43 and the manner in which they secure the disk gangs 39 and 40 to the frame bars 32 and 33 form no part of this invention. Further details of construction thereof may be had by reference to copending U.S. application, Serial No. 667,343, filed June 24, 1957.

Forward supporting beam 41 has secured to its ends depending hangers 44, to the lower ends of which are attached suitable bearings 45 supporting a shaft 46 on which is mounted a plurality of disks 47, the concave faces of which are directed to the right.

The rear gang beam 42 has affixed to its ends and depending therefrom, hangers 48 which carry bearings 49 at their lower ends, supporting a shaft 50 upon which is mounted a plurality of disks 51, the concave faces of which are directed to the left.

The forward end of each of the frame bars 32 and 33 is bent downwardly to form an extension 52, which is pivotally connected by a pivot pin 53 to a lug 54 affixed to and extending downwardly and rearwardly from the tool bar 20. Thus hitch frame 18 is integrally associated with draft structure 15 on the tractor which is capable of vertical floating movement with respect thereto, and tool-carrying frame 19 is pivotally connected at 53 to the hitch frame 18 for vertical floating movement with respect to the latter. While the tool-carrying frame 19 is pivotally connected to hitch frame 18 at 53, provision is made for lifting the tool carrier upon operation of the hydraulic cylinder 30 to raise the draft structure 15 of the tractor and the implement hitch 18. A stop member is provided to limit the pivoting of the tool carrier 19, in the form of a rearwardly and upwardly curved arm 55, the forward end of which is affixed to the tool bar 20 and the rear end of which extends upwardly and rearwardly of brace member 34 and the transverse portion 38 of brace 37, which engages arm 55 when hitch frame 18 is lifted by operation of ram 30 so that the tool carrier portion 19 of the implement is also lifted to a transport position on the tractor. In normal operation of the disk gangs 39 and 40, however, the parts 34 and 38 of the tool-carrying frame are separated from the arm 55 to allow floating of the tool carrier.

The low pivot point at 53 allows the tool-carrying frame 19 to operate very much in the manner of a trail-behind implement in allowing the harrow to follow the contour of the ground, another opening 56 being provided in the extension 52 to lower the pivot point 53 and increase the pressure causing the forward gang of disks 39 to penetrate the soil. It is desirable to utilize the upper opening 56 and increase the down pressure on the forward disk gang when the harrow is operating in light soil.

In heavier soils the tendency is for the rear gang 40 to rise out of the ground while the front gang penetrates deeper and the pivotal connection 53 is as shown in Figure 2. In addition, in order to exert pressure on the rear disk gang 40 to hold it in the ground and avoid the use of conventional weights carried by the harrow frame, pressure applying mechanism is provided and indicated at 57. This mechanism includes a bifurcated extension 58 secured to the rear end of arm 55 and carrying a sleeve 59 mounted on trunnions 60 in the bifurcated upper end of extension 58. A rod-like member 70 having a forwardly extending crank portion 61 is slidably received in sleeve 59 and is provided at its rear end with a tubular internally threaded portion adapted to receive a threaded rod 62 the rear end of which is bent laterally for pivotal reception in an opening provided in a lug 63 affixed to brace 36 and held in place by a cotter pin 64. A collar 65 mounted on rod 60 is provided with a set screw 66 for adjustment thereof to selected positions on the rod, and a spring 67 surrounds the rod between the collar and the sleeve 59. Spring 67 serves to maintain the implement in equilibrium, maintain a downward pressure on the rear gangs opposing the tendency of the tool-carrying frame 19 to pivot upwardly about the axis 53 and minimizing the effects of side draft on the implement.

The spring also serves to render the implement stable when lifted above the ground for transport on the tractor, and the pressure on the rear gang downwardly can be increased or decreased by manipulating the crank 61 and adjusting the position of collar 65.

When operating in very light soil the down pressure provided by spring 67 is undesirable and provision is made for eliminating this down pressure and, further, reducing the cutting depth of the rear disk gang. To do this the collar 65 is optionally moved to the dotted line position shown in Figure 2 ahead of sleeve 59, and this may be accomplished by removing cotter pin 64, sliding the collar off the end of rod 62 and sliding it onto the forward end of member 60. This limits the downward pivoting of tool-carrying frame 19 about the axis 53 to selected positions other than that provided by the engagement of arm 55 with stop 34, 38. By adjusting the collar 65 ahead of sleeve 59 greater ground clearance can also be provided for the implement when raised to transport position.

From the foregoing description it will be clear that applicant has invented a novel tractor-implement combination incorporating the advantages of both direct-connected and trail-behind implements. It should likewise be understood that the invention has been described in its preferred embodiment only, and that modifications may be made therein without departing from the spirit of the invention or the scope of the appended claims.

What is claimed is:

1. A tractor-implement combination comprising a draft structure forming a part of the tractor and mounted thereon for vertical floating, power lift means on the tractor connected to said draft structure for raising and lowering the latter, said lift means including means accommodating said floating of the draft structure, a disk harrow comprising a tool-carrying frame having a pair of longitudinally spaced disk gangs mounted thereon, a hitch frame having means thereon releasably cooperable with said draft structure to form an integral association therewith, whereby said hitch frame floats and is raised and lowered therewith, means pivotally connecting the tool-carrying frame to the hitch frame to accommodate vertical floating thereof relative to the hitch frame, means in the connection of said tool-carrying frame to said hitch frame accommodating free downward swinging of the tool frame but yieldably resisting upward swinging relative thereto, and optionally operable means carried by the tool-carrying frame and engageable with the hitch frame for holding the connection therebetween rigid against downward swinging of the tool-carrying frame relative to the hitch frame.

2. A tractor-implement combination comprising a draft structure forming a part of the tractor and mounted thereon for vertical floating, power lift means on the tractor connected to said draft structure for raising and lowering the latter, said lift means including means accommodating said floating of the draft structure, a disk harrow comprising a tool-carrying frame having a pair of longitudinally spaced disk gangs mounted thereon, a hitch frame having means thereon releasably cooperable with said draft structure to form an integral association therewith, whereby said hitch frame floats and is raised and lowered therewith, means pivotally connecting the tool-carrying frame to the hitch frame to accommodate vertical floating thereof relative to the hitch frame, means in the connection of said tool-carrying frame to said hitch frame accommodating free downward swinging of the tool frame but yieldably resisting upward swinging relative thereto, first stop means acting between said lift means and said draft structure on the tractor operative to accommodate lifting of the latter and said hitch frame, and second stop means acting between said hitch frame and said tool-carrying frame effective to accommodate lifting of the latter with said draft structure and said hitch frame.

3. The invention set forth in claim 2, wherein said last mentioned stop means includes an arm affixed to and extending rearwardly and upwardly from said hitch frame and a part on the tool-carrying frame extends forwardly of the upwardly extending portion of said arm for engagement therewith to limit the downward movement of the tool frame relative to the hitch frame when the implement is lifted.

4. A tractor-implement combination comprising a draft structure forming a part of the tractor, said draft structure being pivoted for vertical floating, power lift means on the tractor connected to said draft structure for raising and lowering the latter, said lift means including means accommodating said floating of the draft structure, a disk harrow comprising a tool-carrying frame having a pair of longitudinally spaced disk gangs mounted thereon, a hitch frame having means thereon releasably cooperable with said draft structure to form an integral association therewith, whereby said hitch frame floats and is raised and lowered with said draft structure, means pivotally connecting the tool-carrying frame to the hitch frame of the implement to accommodate vertical floating relative thereto, an arm affixed to and extending rearwardly and upwardly from said hitch frame, a part on the tool frame extending forwardly of the upwardly extending portion of said arm for engagement therewith to limit the downward movement of the tool-carrying frame relative to the hitch frame when the implement is lifted, a forwardly and upwardly extending rod, adjustable in length, pivotally connected at its rear end to said tool-carrying frame rearwardly of the forwardmost of said disk gangs and slidably connected at its forward end to said arm, spring means on said rod engageable with said arm to yieldably resist upward pivoting of the tool-carrying frame relative to the hitch frame, and additional means mounted on the rod and optionally shiftable to a position in engagement with said arm to selectively limit downward swinging of the tool-carrying frame relative to the hitch frame.

References Cited in the file of this patent

UNITED STATES PATENTS

| | | |
|---|---|---|
| 2,616,348 | Ariens | Nov. 4, 1952 |
| 2,663,239 | Rapp et al. | Dec. 22, 1953 |
| 2,704,018 | Oehler et al. | Mar. 15, 1955 |
| 2,741,967 | Oehler et al. | Apr. 17, 1956 |
| 2,754,738 | Brown | July 17, 1956 |
| 2,788,730 | Kirchner | Apr. 16, 1957 |
| 2,919,754 | Walberg | Jan. 5, 1960 |

FOREIGN PATENTS

| | | |
|---|---|---|
| 653,745 | Great Britain | May 23, 1951 |